(12) United States Patent
Gambhire

(10) Patent No.: US 7,893,994 B2
(45) Date of Patent: Feb. 22, 2011

(54) MOTION ADAPTIVE DIRECTIONAL DEINTERLACING IN A VIDEO DECODER

(75) Inventor: Pranav Gambhire, Andover, MA (US)

(73) Assignee: Broadcom Corporation, Irvine, CA (US)

(*) Notice: Subject to any disclaimer, the term of this patent is extended or adjusted under 35 U.S.C. 154(b) by 936 days.

(21) Appl. No.: 11/279,033

(22) Filed: Apr. 7, 2006

(65) Prior Publication Data
US 2006/0256204 A1  Nov. 16, 2006

Related U.S. Application Data

(60) Provisional application No. 60/681,667, filed on May 16, 2005.

(51) Int. Cl.
H04N 7/01 (2006.01)
H04N 11/20 (2006.01)

(52) U.S. Cl. .................. 348/458; 348/448; 382/300

(58) Field of Classification Search ......... 348/441–459; 382/298–300
See application file for complete search history.

(56) References Cited

U.S. PATENT DOCUMENTS 6,295,091 B1 * 9/2001 Huang .................... 348/448
7,126,643 B2 * 10/2006 Song et al. ............... 348/448
7,154,556 B1 * 12/2006 Wang et al. .............. 348/452
7,190,406 B2 * 3/2007 Ji et al. ................... 348/448

* cited by examiner

*Primary Examiner*—M. Lee
(74) *Attorney, Agent, or Firm*—McAndrews, Held & Malloy, Ltd.

(57) ABSTRACT

Presented herein are system(s), method(s), and apparatus for motion adaptive directional deinterlacing. In one embodiment, there is presented a method for interpolating a pixel for a pixel position. The method comprises receiving a plurality of pixels above the pixel position; receiving a plurality of pixels below the pixel position; and measuring gradients in a plurality of directions between the pixels above the pixel position and the pixels below the pixel position.

17 Claims, 5 Drawing Sheets

MOTION ADAPTIVE DIRECTIONAL DEINTERLACING IN A VIDEO DECODER

PRIORITY CLAIM

This application claims priority to Provisional Application Ser. No. 60/681,667, "Motion Adaptive Directional Deinterlacing in a Video Decoder", by Pranav Gambhire. filed May 16, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In interlacing, the pictures forming the video are captured at two distinct time intervals. The pictures forming the video comprise a plurality of ordered lines. During one of the time intervals, video content for the even-numbered lines is captured. During the other time interval, video content for the odd-numbered lines is captured. The even-numbered lines are collectively known as the top field, while the odd-numbered lines are collectively known as the bottom field.

On an interlaced display, the even-numbered lines are displayed on the even-numbered lines of the display during one time interval, while the odd-numbered lines are displayed on the odd-numbered lines of the display during another time interval.

With progressive displays, however, all of the lines of the display are displayed at one time interval. As noted above, the interlaced video pictures include even-numbered lines captured at one time interval, and odd-numbered lines captured at a second time interval. The deinterlacing process generates pictures for display during a single time interval from the interlaced video.

Deinterlacing by combining content from adjacent fields (known as weaving) is suitable for regions of the picture that are characterized by less object motion or lighting changes (known as inter-field motion). Displaying both the top field and bottom field at the same time interval can be problematic in cases where the video content with high-speed motion or lighting changes. Objects that are in motion are at one position when the top field is captured and another position when the bottom field is captured. If the top field and the bottom field are displayed together, a comb-like, or jagged edge affect will appear with the object. This is referred to as an artifact.

Alternatively, deinterlacers can generate a picture for progressive display by interpolating missing lines in a field from adjacent and surrounding lines. This is known as spatial interpolation, or "bobbing". While spatial interpolation avoids artifacts in regions with high inter-field motion, spatial interpolation loses vertical detail and results in a blurry picture.

Median based deinterlacers use median tests to detect motion for each interpolated pixel. For example, where A and B denote the pixels directly above and below the interpolated pixel in the current field, and where C is the pixel in the exact spatial location in the complimentary field, median interlacers examine the median of A, B, and C. Where the median is C, the median based deinterlacers deduce a monotonic pixel gradient. The monotonic gradient is unlikely if the interpolated pixel and C are part of a moving object. Thus, the median based deinterlacers set the interpolated pixel to C. Where the median is not equal to C, median based deinterlacers set the interpolated pixel to the average of A and B.

The median test can be performed either independently for luma and chroma pixels. Alternatively, a median based deinterlacer can perform the median test on just the luma pixels and use the results to update both the luma and chroma components. Median based algorithms use three lines of storage and simple comparators with integer averaging.

However, the foregoing can introduce some unpleasant artifacts. At the edge of a moving object a hard transition is made from pixel copying to pixel averaging. Due to unequal object motion between fields and due to noise, the exact location of this transition is not constant. A pixel on the edge, which was spatially averaged in one field, could be simply copied in the next field and vice versa. This causes a buzzing flicker artifact along the edge. Additionally, the averaging function of vertically adjacent pixel implicitly assumes that the pixel gradients are vertically oriented. This is not always true at object edges where the gradients are oriented along the object's edge. This can cause a stair step pattern pixel reconstruction.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Presented herein are system(s), method(s), and apparatus for motion adaptive directional deinterlacing.

In one embodiment, there is presented a method for interpolating a pixel for a pixel position. The method comprises receiving a plurality of pixels above the pixel position; receiving a plurality of pixels below the pixel position; and measuring gradients in a plurality of directions between the pixels above the pixel position and the pixels below the pixel position.

In another embodiment, there is presented a circuit for interpolating a pixel for a pixel position. The circuit comprises a processor and a memory. The memory is connected to the processor and stores a plurality of instructions that are executable by the processor. Execution of the instructions causes receiving a plurality of pixels above the pixel position; receiving a plurality of pixels below the pixel position; and measuring gradients in a plurality of directions between the pixels above the pixel position and the pixels below the pixel position.

These and other advantages and novel features of the present invention, as well as details of an illustrated embodiment thereof, will be more fully understood from the following description and drawings.

DETAILED DESCRIPTION OF THE INVENTION

Figure 1:
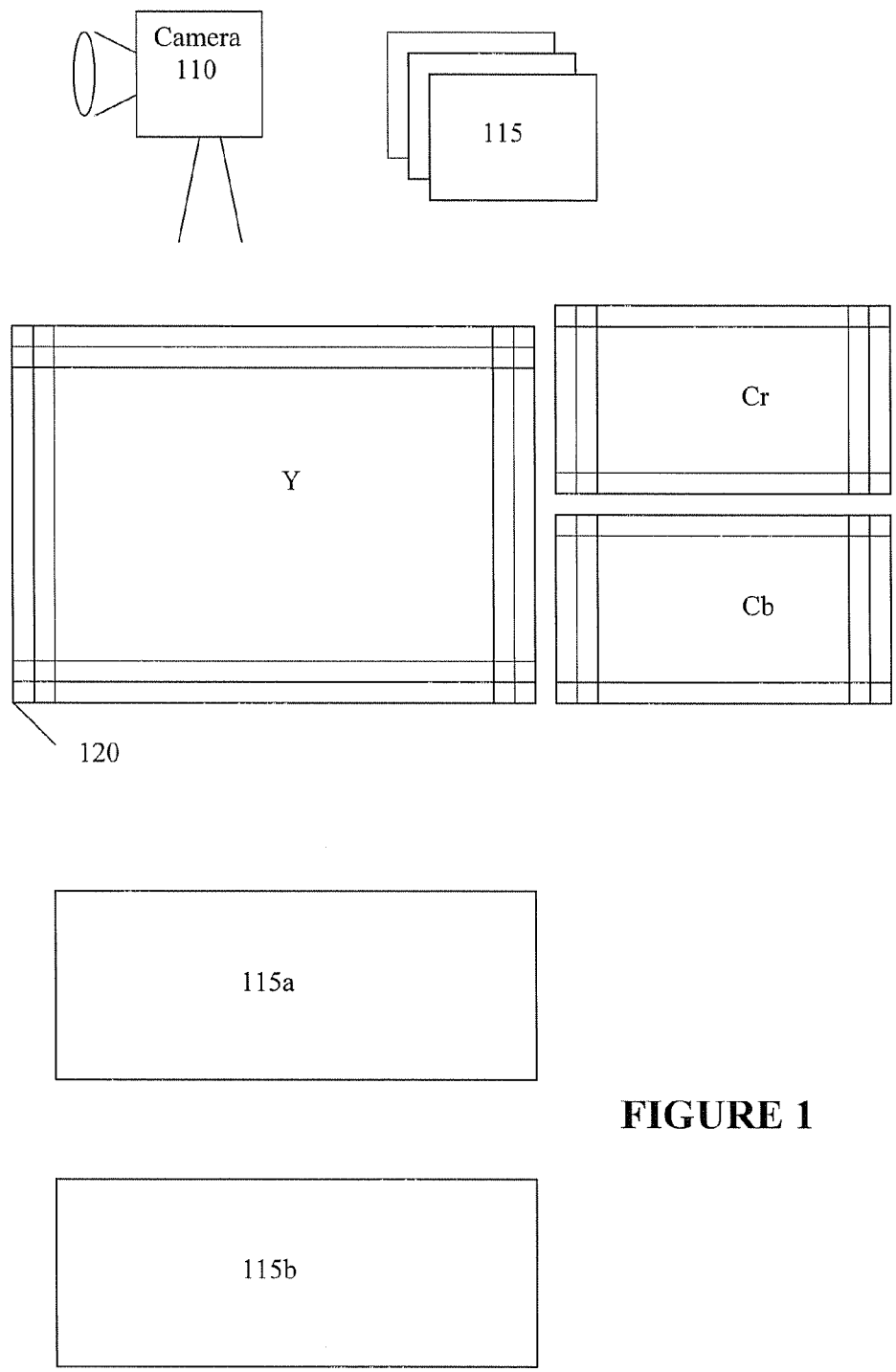
FIG. 1 is a block diagram of an exemplary interlaced video.

Referring to FIG. 1 is a block diagram of an exemplary video 105. A video 105 is generated by a video camera 110 and represents images captured by the camera 110 at specific time intervals. A picture 115 represents each image. The pictures 115 comprise two-dimensional grids of pixels 120, wherein each pixel in the grid corresponds to a particular spatial location of an image captured by the camera. The grids include chroma red pixels Cr, chroma blue pixels Cb, and luma pixels Y.

Each pixel 120 stores a color value describing the spatial location corresponding thereto. Accordingly, each pixel 120 is associated with two spatial parameters (x,y) as well as a time parameter. An interlaced camera, scans the rows 120(-, y) of a picture 115 in odd/even alternating order. The even numbered lines are scanned at one time, t0, followed by the odd numbered lines scanned at another time, t1. The partial images of the even number lines are known as top fields 115a, while the partial images of the odd numbered lines are referred to as bottom fields 115b.

Figure 2:
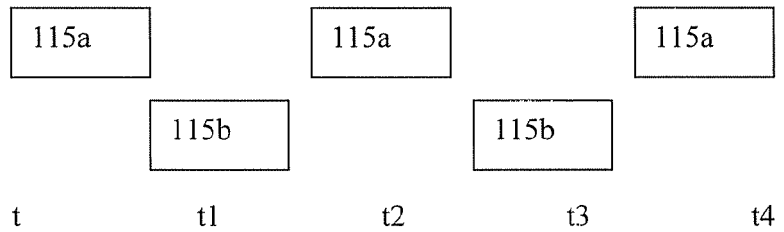
FIG. 2 is a block diagram of a progressive display in accordance with an embodiment of the present invention.
Figure 2:
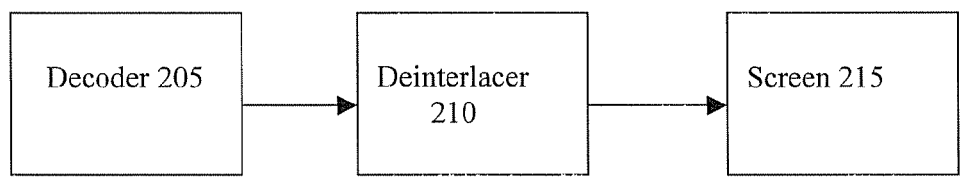
Figure 2:
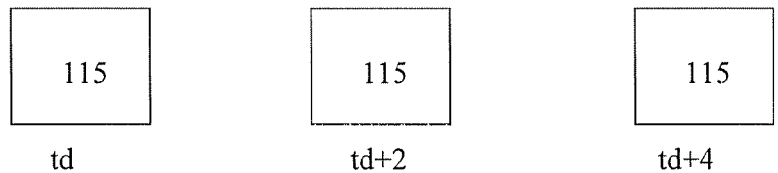

Referring now to FIG. 2, there is illustrated a block diagram describing an exemplary progressive display 200, in accordance with an embodiment of the present invention. The progressive display 200 comprises a video decoder 205, a deinterlacer 210, and a screen 215. When the top field 115a and bottom field 115b are displayed at the rate of capture, motion picture is simulated. For example, where the fields 115a/115b are captured at times t0 . . . tn, an interlaced display device can display the fields 115a/115b at corresponding times td+0 . . . td+n. The foregoing simulates the motion appearing from the vantage point of the camera at the times t0 . . . tn.

The progressive display displays all of the lines 120(-, y) of a picture 115 during each display interval on the screen 115, and may have a display rate that is half the field capture rate of the video camera. For example, the progressive display 200 may display an entire picture 115 at time intervals td, td+2, td+4, . . . . Where an interlaced video is to be displayed by the progressive display 200, it is possible that only one field 115a/115b corresponds to the display time. For example, at display time td+2, top field 115a captured at t2 is the only field corresponding to the time. Accordingly, the deinterlacer 210 generates the pixels for the odd-numbered lines 120(-, 2y+1) for the picture 115 to be displayed at td+2.

The deinterlacer 210 generates the pixel for the odd-numbered lines using the top field 115a, the bottom field 115b' immediately preceding the top field 115a, and/or the bottom field 115b" immediately following the top field 115a. The deinterlacer 210 generates the pixels for the odd-numbered lines using a blended average between spatial and temporal interpolations. Alternatively, the deinterlacer 210 can generate even-numbered lines where a bottom field corresponds to the time period of display.

Figure 3:
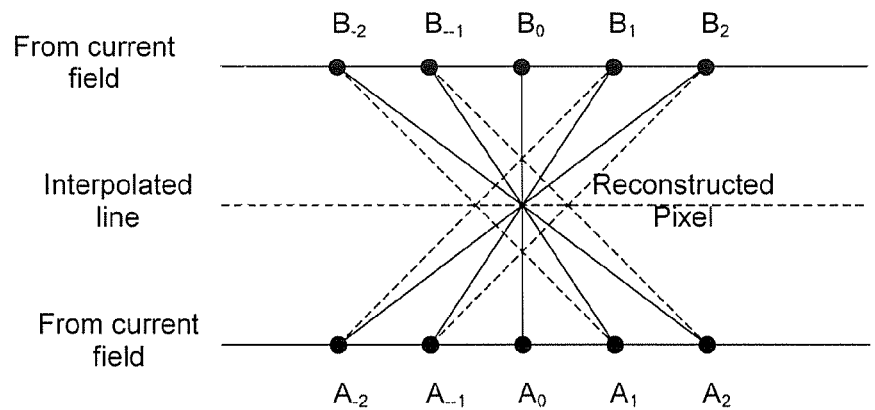
FIG. 3 is a block diagram describing luma pixels in a field.
Figure 4:
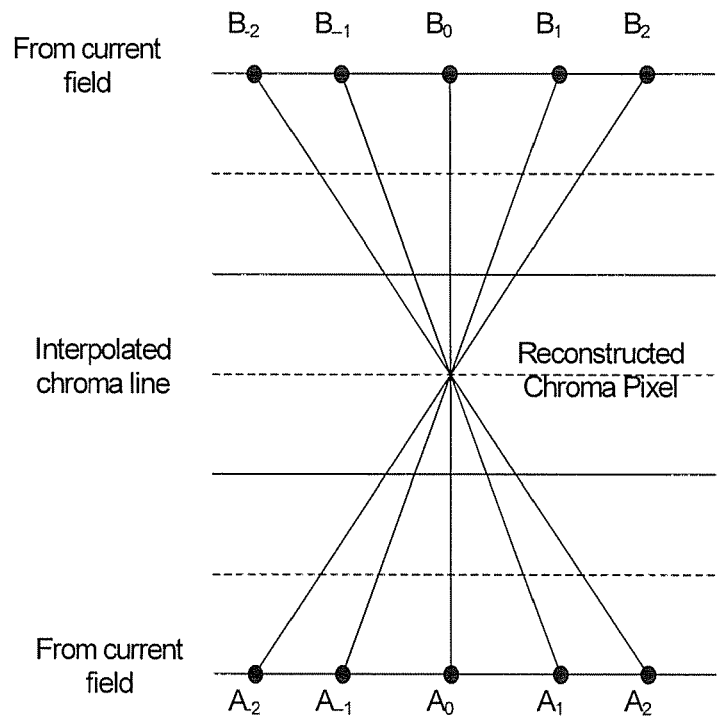
FIG. 4 is a block diagram describing chroma pixels in a field.

Directional Spatial Averaging:

Referring now to FIG. 3, there is illustrated a block diagram describing luma pixels in a field 115a/115b. FIG. 4 is a block diagram describing chroma pixels in a field 115a/115b. Object edges through the reconstructed pixel can be at any angle to horizontal. The spatial averaging mechanism estimates the edge angle by comparing pixel values at several orientations through the reconstructed pixel. Five pixels are examined from the line above and below the pixel as shown in FIGS. 3-4. Both luma and chroma components are used to determine the direction of the spatial averaging.

The solid lines are the edge orientations that pass through the center of the interpolated pixel. The dotted lines are the edge orientations that graze the interpolated pixel without passing through its center. The algorithm identifies the most likely edge orientation by examining absolute pixel differences along each of these (both solid and dotted) lines.

Let $A_i$ (i=-2, 2) denote the five pixels from the line below the reconstructed line that surround the reconstructed point. Similarly let $B_i$ (i=-2, 2) denote the five pixels from the line above the reconstructed line that surround the reconstructed point. The absolute pixel difference between a point $A_i$ and $B_{-j}$ is denoted as $d_{ij}$. If the object edge passes through or close to $A_m B_{-n}$ then $d_{mn}$ will have the smallest magnitude among all $d_{ij}$. The reconstructed point will hence be a good approximation if it is a spatial average of the points $A_m$ and $B_{-n}$. If the reconstructed point is not on an edge, then all the $d_{ij}$s will be very close to each other and a spatial average between $A_0$ and $B_0$ will produce an acceptable result for the reconstructed point.

Figure 5:
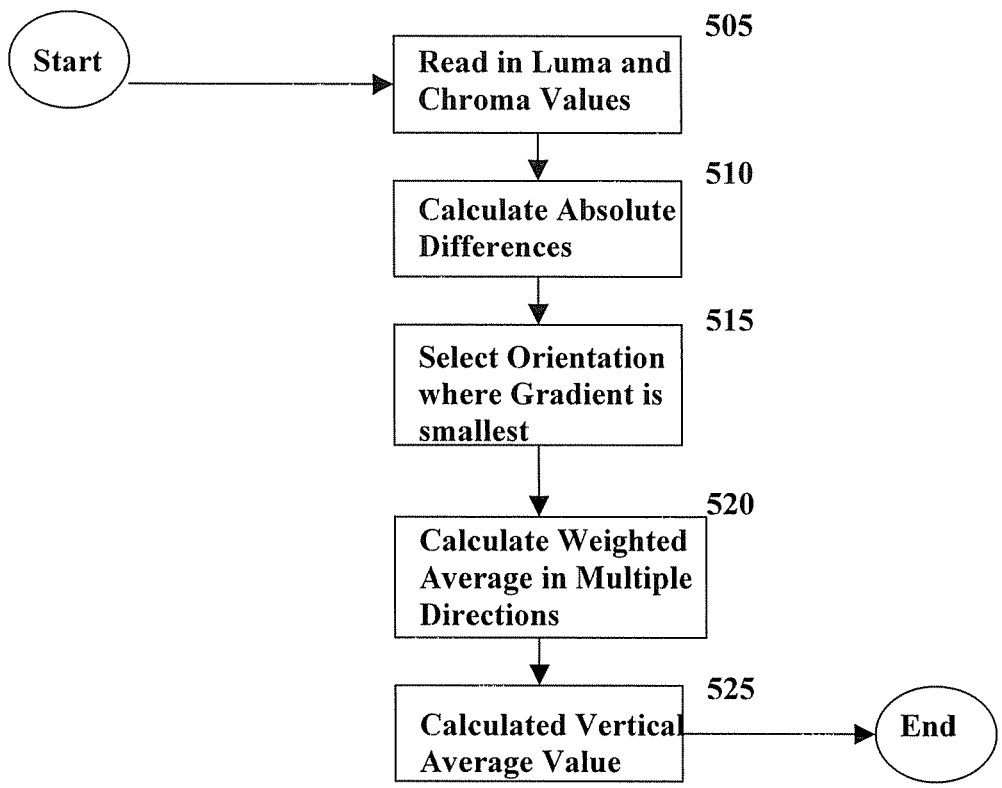
FIG. 5 is a flow diagram for spatially interpolating a pixel in accordance with an embodiment of the present invention.

Referring now to FIG. 5, there is illustrated a flow diagram for spatially interpolating a pixel. The flow diagram will be described with reference to FIGS. 3 and 4.

At 505, the luma values and chroma values for the five pixels above A and below B the reconstructed pixel are read in. If the reconstructed pixel is in the first line, the above line B is used twice. If the reconstructed line is the last line, the bottom line A is used twice.

At 510, the absolute differences $d_{ij} = |A_i - B_{-j}|_{\text{for all } (i<0 \text{ and } j>0) \text{ and for } (i>0 \text{ and } j<0)}$ i.e., along all the lines (both solid and dotted) of FIGS. 3 and 4. At the left vertical edge set $A_{-2}$, $A_{-1}$ both equal $A_0$ and $B_{-2}$, $B_{-1}$ both equal $B_0$. Similarly at the right vertical edge set $A_1$, $A_2$ both equal $A_0$ and $B_1$, $B_2$ both equal $B_0$.

At 515, the orientation mn is found, such that $d_{mn}$ is the smallest. At 520, a weighted average of pixels in multiple directions is calculated. The weighted average is calculated as follows:

a. m==-2: If n==2, calculate the reconstructed pixel luma value as $Y = (A_{-2} + A_{-1} + B_1 + B_2 + 1)/4$. Otherwise n==1 calculate $Y = 3((A_{-2} + B_1 + 1)/2 + (A_{-1} + B_0 + 1)/2 + 3)/4$.
  b. m==-1: If n==1 then $Y = (A_{-1} + B_1 + 1)/2$. Otherwise n==2, $Y = (A_{-1} + B_2 + 1)/2$.
  c. m==0: $Y = (A_0 + B_0 + 1)/2$.
  d. m==1: If n==-1 then $Y = (A_1 + B_{-1} + 1)/2$. Otherwise n==2, $Y = (A_1 + B_{-2} + 1)/2$.
  e. m==2: If n==-2, calculate the reconstructed pixel luma value as $Y = (A_2 + A_1 + B_{-1} + B_{-2} + 1)/4$. Otherwise n==-1 calculate $Y = 3(A_2 + B_{-1} + 1)/2 + (A_1 + B_0 + 1)/2 + 3)/4$.

At 525, the vertical average pixel value is calculated, $Y_{vert} = (A_0 + B_0 + 1)/2$. At 530, if the pixel being reconstructed is chroma, 520-525 are repeated. At 535, spatial interpolation value for the reconstructed pixel is the weighted average: $I_{sp} = (3Y + Y_{vert})/4$. If the reconstructed pixel is a chroma sampling position, the chroma values using chroma components from 525 in this equation are calculated.

Four Line Spatial Interpolation

Alternatively, four-line spatial interpolation can be performed. An edge can be making any angle between 0 and 90 degrees to the horizontal. This entire scale can be partitioned into four non-uniform ranges (0-11.5), (11.5-44.5), (44.5-57.5), (57.5-80.5), and (80.5-90). Each range of angles is associated with a separate two or four tap directional spatial filter. The results of the directional filters are a weighted averaged with the vertical pixel interpolation to prevent the buzz from hard filtering decisions.

Figure 6:
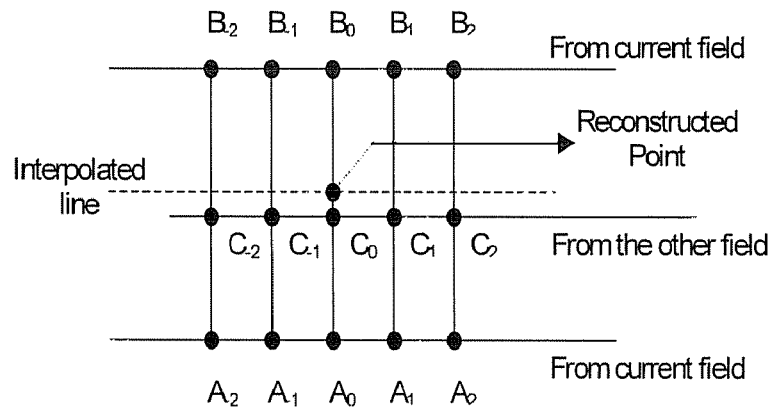
FIG. 6 is a block diagram describing pixels for spatially interpolating pixels.

Referring now to FIG. 6, there is illustrated a block diagram describing pixels for spatially interpolating a reconstructed pixel. The pixels include five pixels $A_{-2} \ldots A_2$ in the line above the reconstructed pixel, another pixel that is three lines above the reconstructed pixel $P_0$, five pixels $B_{-2} \ldots B_2$ that are below the reconstructed pixel, and another pixel that is three lines below the reconstructed pixel, $Q_0$.

Figure 7:
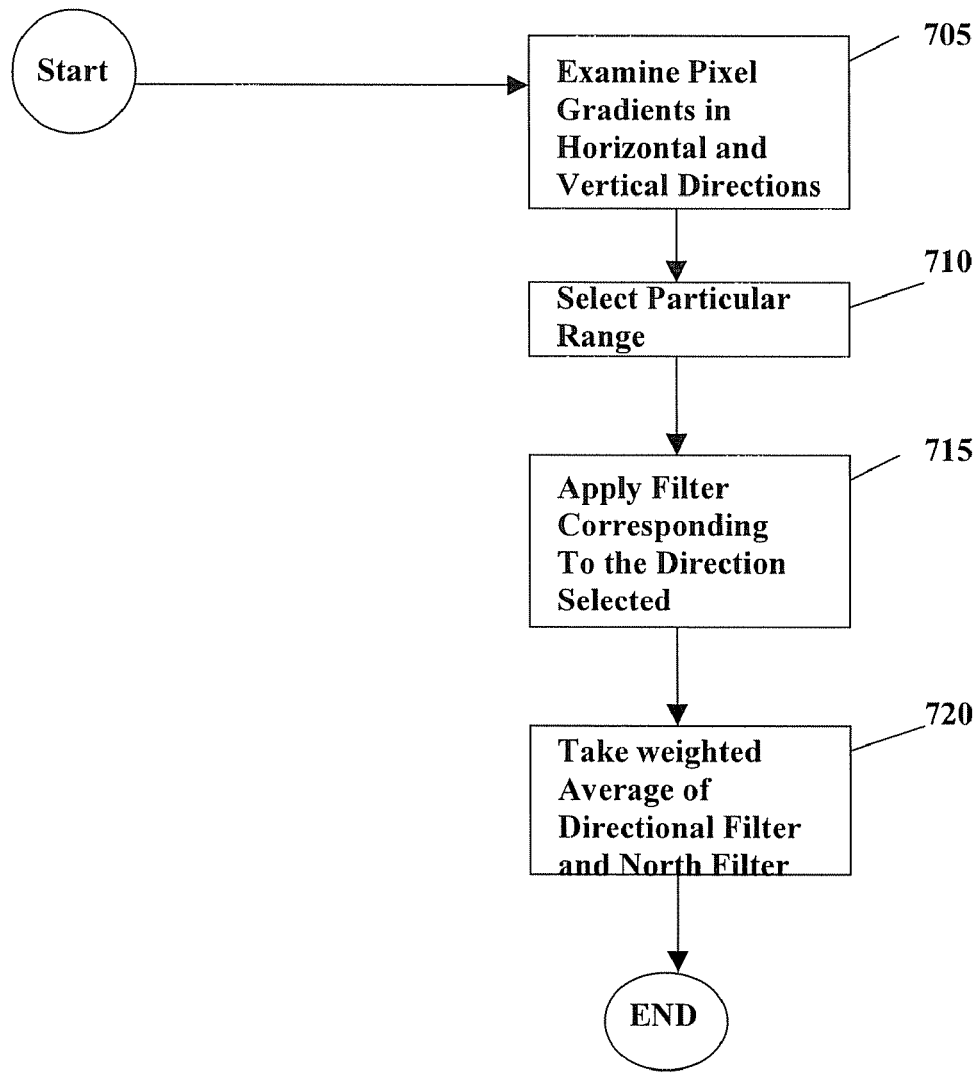
FIG. 7 is a flow diagram for spatially interpolating a pixel in accordance with an embodiment of the present invention.

Referring now to FIG. 7, there is illustrated a flow diagram for spatial interpolation using four lines. At 705, the pixel gradients in the horizontal and vertical directions around a pixel to be reconstructed are examined. The gradients are calculated as:

$$dx = (A_{-1} - A_1)/2 + (B_{-1} - B_1)/2$$

$$dy = (A_{-1}/2 + A_0 + A_1/2)/2 - (B_{-1}/2 + B_0 + B_1/2)/2$$

At 710, a particular range is selected. The exact angle made with the horizontal is given be arctan (|dy|/|dx|), when dx is non-zero. If dx is zero, the edge is vertical. Rather than the actual value of the angle, which of the non-uniform ranges that the angle belongs to is determined. By determining tan(a) for all the a's that form the range boundaries, the following decision procedure is arrived at:

```
GradientSign = sign(dx*dy)
scaledDy = 500*dy;
If (scaledDy < 99*dx)
    direction = North;
Else if (scaledDy < 334*dx)
    direction = (gradientSign > 0) ? NorthNorthEast :
NorthNorthWest;
Else if (scaledDy < 748*dx)
    direction = (gradientSign > 0) ? NorthEast :
NorthWest;
Else if (scaledDy < 2514*dx)
    direction = (gradientSign > 0) ? NorthEastEast :
NorthWestWest;
Else
    direction = East;
```

At 715, a filter corresponding to the direction selected during 710 is applied. The filters for each of the directions is as follows:

```
North:
    dirInterpolation = (35A_0 + 35B_0 − 3P_0 − 3Q_0 ) / 64
East:
    dirInterpolation = (A_0 + B_0) / 2
NorthEast:
    dirInterpolation = (A_1 + B_−1) / 2
NorthWest:
    dirInterpolation = (A_−1 + B_1) / 2
NorthNorthEast:
    dirInterpolation = (A_1 + A_0 + B_0 + B_−1) / 4
NorthNorthWest:
    dirInterpolation = (A_0 + A_−1 + B_0 + B_1) / 4
NorthEastEast:
    dirInterpolation = (A_2 + A_1 + B_−1 + B_−2) / 4
NorthWestWest:
    dirInterpolation = (A_−2 + A_−1 + B_1 + B_2) / 4
```

At 720, the final spatial interpolation is a weighted average of the directional filter and the north filter:

$$I_{SP} = (3 * \text{dirInterpolation} + ((35A_0 + 35B_0 - 3P_0 - 3Q_0)/64))/4$$

Temporal Interpolation

In the absence of object motion, a pixel can be accurately reconstructed by copying over its value from a complementary field. Object motion can be deduced at the pixel level by examining the median of: (1) the pixel directly above the reconstructed pixel; (2) the pixel at the same location as the reconstructed pixel in the complementary field; and (3) the pixel directly below the reconstructed pixel.

Where $T_i$ denotes the pixel being reconstructed, $A_i$ denotes the pixel on the scan line immediately below $T_i$, $B_i$ denotes the pixel immediately above $T_i$ and $C_i$ denotes the pixel at the same location as $T_i$ but in the other field, if median $(A_i, B_i, C_i)$ is equal to $C_i$ the pixel $T_i$ is not likely to be on a moving object edge and $C_i$ is a good approximation for $T_i$. However if median $(A_i, B_i, C_i)$ does not equal $C_i$, then $T_i$ is likely to be on a moving edge and is best approximated using spatial interpolation.

The median is calculated for both luma and chroma components. If the median test indicates motion for ANY component, the reconstructed pixel is taken to be on a moving edge and is spatially interpolated.

It is likely that the reconstructed pixel to the left of $T_i$, $T_{i-1}$, was a copy of $C_{i-1}$ and $T_i$ is a spatial average and vice versa. On slow moving object edges, the same pixel may alternate between spatial and temporal interpolations on successive fields. This causes the edges to be blurred on some reconstructed frames and sharp on others, thus causing a flickering artifact. Avoiding a hard transition between spatial and temporal interpolation can minimize this flicker. Examining the medians at two neighboring pixels on each side of reconstructed pixel and then taking a weighted average of the motion detection decisions, avoids these hard transitions.

Figure 8:
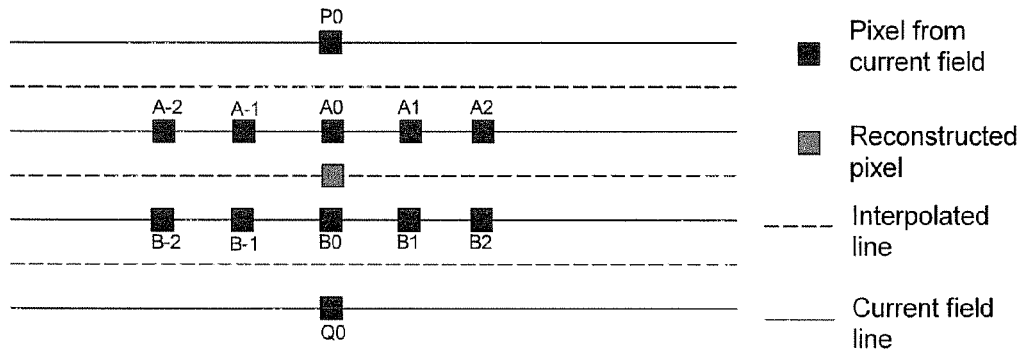
FIG. 8 is a block diagram describing pixels for temporally interpolating a pixel.

Referring now to FIG. 8, there is illustrated a block diagram describing an exemplary pixels from a current field a complimentary field. The pixels $A_{-2}, \ldots A_2$, and $B_{-2}, \ldots B_2$ are from the current field, while pixels $C_{-2}, \ldots C_2$ are from the complimentary field.

Figure 9:
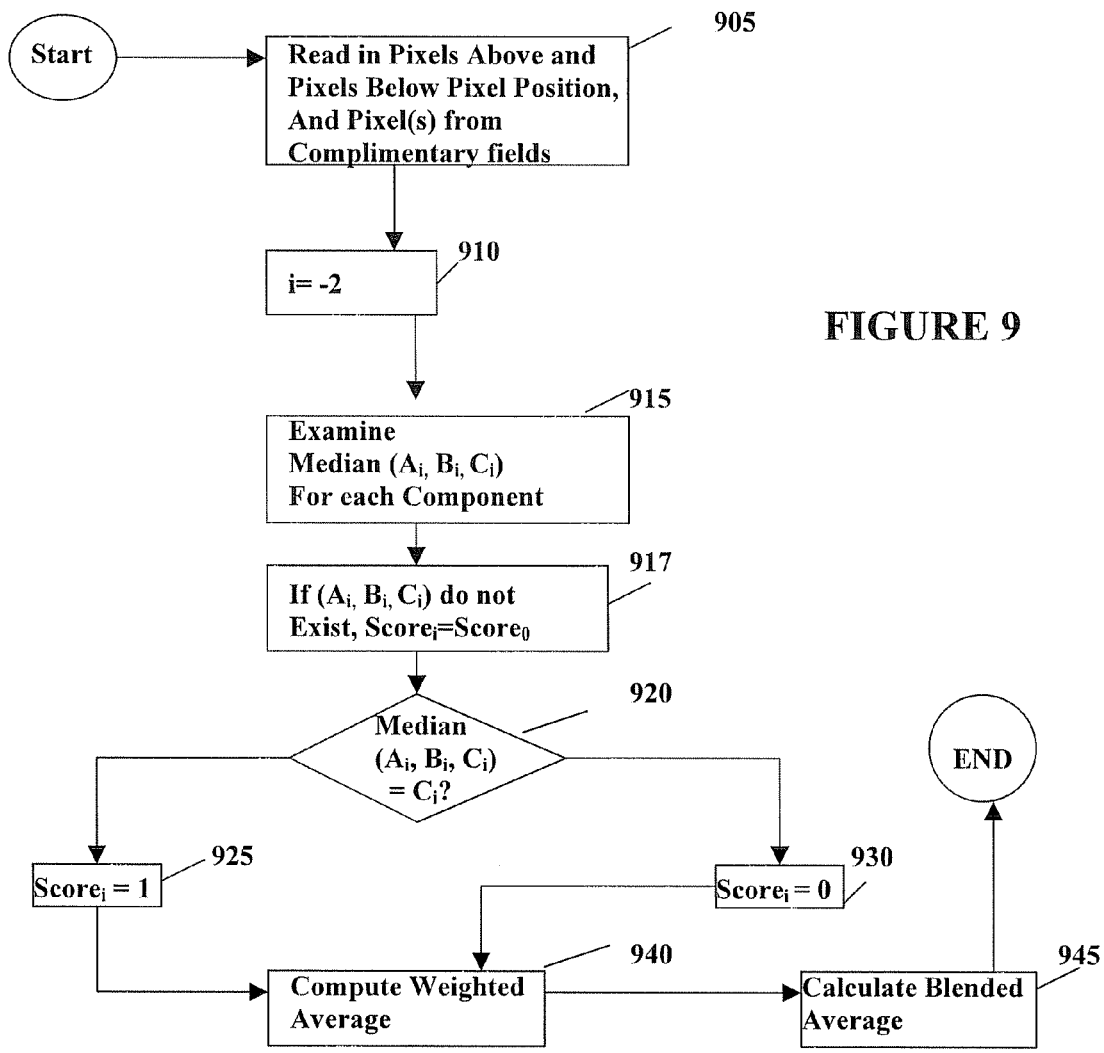
FIG. 9 is a flow diagram for interpolating a pixel in accordance with an embodiment of the present invention.

FIG. 9 is a flow diagram for temporal interpolation in accordance with an embodiment of the present invention. FIG. 9 will be described with reference to FIG. 8. At 905, the luma and chroma values of the five pixels above $A_{-2}, \ldots A_2$ and below $B_{-2}, \ldots B_2$ the pixel to be reconstructed from the current field are read in, as well as the values of the two pixels $C_0$ on either side from the complementary field. At 910, i is set equal to −2 and score is set equal to 0. At 915, for each i= −2, . . . 2, the medians $(A_i, B_i, C_i)$ for each component are examined. If at 915, $(A_i, B_i, C_i)$ do not exist because of the vertical edge of the picture, at 917, the $\text{Score}_i$ is set equal to $\text{Score}_0$. If at 920, the median $(A_i, B_i, C_i)$ is equal to $C_i$ for either the luma component or any one of the chroma components, then $\text{Score}_i=1$ at 925. Otherwise at 930 $\text{Score}_i=0$. At 940, the weighted average of the motion scores is calculated based on the formula below:

$$\text{Motion} = [\text{Score}_{-2} + 4\text{Score}_{-1} + 6\text{Score}_0 + 4\text{Score}_1 + \text{Score}_2]$$

At 945, the pixel value is then reconstructed as the blended average between the $C_i$ and $I_{sp}$ according to the formula below:

$$\text{Recon} = [\text{Motion} * I_{sp} + (16 - \text{Motion}) * C_i]/16$$

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware. In one embodiment, a deinterlacer can be incorporated into a single integrated circuit.

Although the embodiments described herein are described with a degree of particularity, it should be noted that changes, substitutions, and modifications can be made with respected to the embodiments without departing from the spirit and scope of the present application. Accordingly, the present application is only limited by the following claims and equivalents thereof.

The invention claimed is:

1. A method for interpolating a pixel for a pixel position, said method comprising:
   receiving a plurality of pixels above the pixel position in circuit;
   receiving a plurality of pixels below the pixel position;
   measuring differences of a plurality pixel pairs from the plurality pixels above the pixel position and the plurality of pixels below the pixel position, each of said plurality of pixel pairs defining a respective one of a plurality of directions between the pixels above the pixel position and the pixels below the pixel position;
   selecting one of the plurality of pixel pairs defining a particular one of the plurality of directions, wherein the one of the plurality of pixel pairs has the lowest difference; and
   interpolating a spatially interpolated pixel based at least in part on one of the plurality of pixels above the pixel position and below the pixel position, wherein at least one of the pixels above the pixel position are at least three rows above the pixel position, and wherein at least one of the pixels below the pixel position are at least three rows below the pixel position.

2. The method of claim 1, further comprising:
   measuring the motion between a field and a complimentary field, wherein the field comprises the pixels above the pixel position and the pixels below the pixel position.

3. The method of claim 2, further comprising:
   calculating a weighted average from at least one of the plurality of directions and a horizontal direction, thereby generating a spatially interpolated pixel; and
   calculating a weighted average from the spatially interpolated pixel and a pixel in the complimentary field.

4. The method of claim 3, wherein the weighted average is a function of the measured motion between the field and the complimentary field.

5. A circuit for interpolating a pixel for a pixel position, said circuit comprising:
   a processor; and
   memory connected to the processor, said memory storing a plurality of instructions executable by the processor, wherein execution of the instructions causes:
      receiving a plurality of pixels above the pixel position;
      receiving a plurality of pixels below the pixel position;
      approximating gradients in a plurality of directions between the pixels above the pixel position and the pixels below the pixel position; and
      determining a median of at least one of the plurality of pixels above the pixel position, at least one of the plurality of pixels below the pixel position and a pixel in the pixel position of a complimentary field;
      interpolating the pixel as a function of any pixel of the plurality of pixels above the pixel position, the plurality of pixels below the pixel position, and the pixel in the complimentary field in the pixel position; and
   wherein at least one of the pixels above the pixel position are at least three rows above the pixel position, and wherein at least one of the pixels below the pixel position are at least three rows below the pixel position.

6. The circuit of claim 5, wherein execution of the instructions by the processor further causes:
   calculating a weighted average from at least one of the plurality of directions and a horizontal direction, thereby generating a spatially interpolated pixel.

7. The circuit of claim 5, wherein execution of the instructions by the processor further causes:
   measuring the motion between a field and a complimentary field, wherein the field comprises the pixels above the pixel position and the pixels below the pixel position.

8. The circuit of claim 7, wherein execution of the instructions by the processor further causes:
   calculating a weighted average from at least one of the plurality of directions and a horizontal direction, thereby generating a spatially interpolated pixel;
   calculating a weighted average from the spatially interpolated pixel and a pixel in the complimentary field.

9. The circuit of claim 8, wherein the weighted average is a function of the measured motion between the field and the complimentary field.

10. The circuit of claim 1, wherein interpolating the pixel for the pixel position is always a function of the average of a pixel directly above the pixel position and the below the pixel position.

11. A circuit for interpolating a pixel for a pixel position, said circuit comprising:
   a processor; and
   memory connected to the processor, said memory storing a plurality of instructions executable by the processor, wherein execution of the instructions causes:
      receiving a plurality of pixels above the pixel position;
      receiving a plurality of pixels below the pixel position;
      approximating gradients in a plurality of directions between the pixels above the pixel position and the pixels below the pixel position; and
      determining a median of at least one of the plurality of pixels above the pixel position, at least one of the plurality of pixels below the pixel position and a pixel in the pixel position of a complimentary field;
      interpolating the pixel as a function of any pixel of the plurality of pixels above the pixel position, the plurality of pixels below the pixel position, and the pixel in the complimentary field in the pixel position; and
      calculating a weighted average from at least one of the plurality of directions and a horizontal direction, thereby generating a spatially interpolated pixel.

12. The circuit of claim 11, wherein execution of the instructions by the processor further causes:
   measuring the motion between a field and a complimentary field, wherein the field comprises the pixels above the pixel position and the pixels below the pixel position.

13. The circuit of claim 12, wherein execution of the instructions by the processor further causes:
calculating a weighted average from at least one of the plurality of directions and a horizontal direction, thereby generating a spatially interpolated pixel;
calculating a weighted average from the spatially interpolated pixel and a pixel in the complimentary field.

14. The circuit of claim 13, wherein the weighted average is a function of the measured motion between the field and the complimentary field.

15. The circuit 11, wherein approximating gradients in a plurality of directions between the pixels above the pixel position and the pixels below the pixel position further comprises calculating an arctangent function of a gradient in a vertical direction and a gradient in the horizontal direction.

16. The method of claim 3, wherein the horizontal direction does not intersect the pixel position.

17. The circuit of claim 11, wherein the horizontal direction does not intersect the pixel position.

* * * * *